US006938253B2

(12) United States Patent
Kim

(10) Patent No.: US 6,938,253 B2
(45) Date of Patent: Aug. 30, 2005

(54) MULTIPROCESSOR COMMUNICATION SYSTEM AND METHOD

(75) Inventor: Jason Seung-Min Kim, San Jose, CA (US)

(73) Assignee: PortalPlayer, Inc., Santa Clara, CA (US)

( * ) Notice: Subject to any disclaimer, the term of this patent is extended or adjusted under 35 U.S.C. 154(b) by 842 days.

(21) Appl. No.: 09/847,976

(22) Filed: May 2, 2001

(65) Prior Publication Data

US 2002/0165896 A1 Nov. 7, 2002

(51) Int. Cl.[7] .................................................. G06F 9/46
(52) U.S. Cl. ........................ 718/102; 718/104; 718/107
(58) Field of Search ................................ 718/100, 102, 718/103, 104, 106, 107

(56) References Cited

U.S. PATENT DOCUMENTS

| 5,920,714 | A | 7/1999 | Schiffleger | 395/588 |
| 5,951,638 | A | 9/1999 | Hoss et al. | 709/206 |
| 5,968,153 | A | 10/1999 | Wheeler et al. | 710/110 |
| 6,009,389 | A | * 12/1999 | Dokic et al. | 704/228 |
| 6,145,007 | A | * 11/2000 | Dokic et al. | 709/230 |
| 6,188,381 | B1 | 2/2001 | van der Wal et al. | 345/112 |
| 6,456,628 | B1 | * 9/2002 | Greim et al. | 370/466 |
| 6,678,801 | B1 | * 1/2004 | Greim et al. | 711/148 |

OTHER PUBLICATIONS

PCT International Search Report dated Aug. 2, 2002.

* cited by examiner

Primary Examiner—Majid Banankhah
(74) Attorney, Agent, or Firm—David Jaffer; Pillsbury Winthrop Shaw Pittman LLP

(57) ABSTRACT

To facilitate inter-processor communication between multiple processors in a computer system and to enable the accessing of a dual port memory, or other system resources, without requiring the memory or the data/address bus to be locked, the present invention provides a semaphore unit that preferably incorporates a shared mailbox architecture that, in combination with a set of hardware semaphore registers, enables inter-process communication among the multiprocessors. Cooperative multitasking may be accomplished through the use of shared mailbox communication protocols while a preemptive multitasking may be accomplished through the use of hardware semaphore registers.

20 Claims, 3 Drawing Sheets

| uP-REG NAME | ADDRESS | TYPE | SIZE | DISCRIPTION | MSB 31 | 30 | 29 | 28 | 27 | 26 | 25 | 24 | 23 | 22 |
|---|---|---|---|---|---|---|---|---|---|---|---|---|---|---|
| Process Generator | | | | | | | | | | | | | | |
| uP-TAG | C400:0000 | RO | 1W | Unique Process TAG (55=CPU, AA=COP) | | | | | | | | | | |
| uP-REG | C800:3XXX | R/W | 16W | Unique Processor Private Register (RSVD) | | | | | | | | | | |
| Semaphore Controller | | | | | | | | | | | | | | |
| SHRD_SMP.STA | C800:4000 | RO | 32b | Shared Resource Semaphore Status | RAM3 | RAM2 | RAM1 | RAM0 | MEM | IO | SMP.25 | SMP.24 | SMP.23 | SMP.22 |
| SHRD_SMP.SET.REQ | C800:4004 | set.rq | 32b | Shared Resource Semaphore Set-bit Request | | RAM_REQ | | | MEM_REQ | | SET.25 | SET.24 | SET.23 | SET.22 |
| SHRD_SMP.CLR | C800:4008 | clr | 32b | Shared Resource Semaphore Clr-bit Request | | RAM_RLS | | | MEM_RLS | | CLR.25 | CLR.24 | CLR.23 | CLR.22 |
| SHRD_IN.BOX | C800:4010 | Msg | 32b | Shared Resource InBox (CPU read-clears TAG) | IE.IBF | IE.IBE | TAG | 0 | IN.BOX STAT | | | | | |
| SHRD_OUT.BOX | C800:4020 | Msg | 32b | Shared Resource OutBox (COP read-clears TAG) | IE.OBF | IE.OBE | TAG | 0 | OUT.BOX STAT | | | | | |

Figure 3

MULTIPROCESSOR COMMUNICATION SYSTEM AND METHOD

The present invention relates generally to managing communications between multi-processors in a multiprocessor system where it is desirable to provide the fastest access by the processors to the common resources.

BACKGROUND OF THE INVENTION

When a particular application/project/job requires more processing power than a single processor is capable of providing, it becomes necessary to provide a co-processor, such as a digital signal processor (DSP) or a floating point unit (FPU). Thus, the tasks associated with the particular application are handled in unison by the main processor and the co-processor. The most common conventional solution to solving the problem of how to allocate the resources to the multiple processors is to utilize a dual-ported memory subsystem wherein each processor has equal access to the common resources that may be used by both processors. Alternatively, each processor may be provided with a dedicated resource and a mechanism for transferring commands and data through a shared "Mail Box." The shared "Mail Box" typically includes a number of first in/first out (FIFO) registers of varying length.

The conventional dual-ported memory solution provides processor independent design implementation, but requires a large amount of hardware for the random access arbitration for both processors. Consequently, the actual implementation of the arbitration logic and the random access for the common bus creates more delay on the common resources since the access to the common bus must be determined prior to accessing the common resources. The typically small degradation in the access speed in the dual-ported memory is magnified by a significant amount when that common resource is the main memory because the main memory is the common resource most utilized by both processors. Therefore, the interdependency of the multiple processors increases since they both rely heavily on the main memory.

The conventional dedicated resource for each processor with the share "Mail Box" scheme prevents the multiple processors from competing with each other for e same resource, but suffers greatly in terms of access speed both since the data and commands must all pass through the "Mail Box" which has a relatively narrow bandwidth. In addition duplicative resources are necessary since each processor has its own dedicated and duplicated resources. Although the scheme works quite well when the tasks for the processors are well defined and common mailbox data transfer size is relatively small, the actual performance resource utilization suffers greatly when the tasks are not well defined and the processors are therefore more interdependent. Thus, there is a need in the art for a system and method which permits multiple processors to communicate with each other and control the access to the shared resources.

Although multiprocessors enhance the performance of a computer system, the multiple processors also create additional problems, such as when more than one of the processors attempts to access a shared hardware or software resource at the same time. A conventional solution to this problem has been through the use of semaphores located in memory. In general, semaphores are counters that are used to control access to shared resources by multiple processes. Semaphores are commonly used as a locking mechanism to prevent processes from accessing a particular resource while another process is performing operations on it. In operation, for example, if a processor wants to access a system resource it must first check the status of the desired resource by sending a read command over the system bus to the associated semaphore in the system memory, and the semaphore returns the status information back to the processor. If the desired resource is available, the processor sends a write command to the semaphore to change the status of the semaphore from "available" to "unavailable." To prevent another process or processor from checking the status of the semaphore concurrent with the processor, prior to sending the read command, the processor will traditionally lock the system bus until the read/write routine is completed. Not only does locking the system bus prevent another processor or "master" from accessing the particular semaphore, but it also prevents the other processors from communicating with the other devices on the bus. This is disadvantageous in that it slows the efficiency of the system, resulting in an increased latency of system operations which defeats the advantages of utilizing a multiple processor architecture.

Accordingly, there is a need in the art for a system and method that permits multiple processors to communicate with each other and to control access to shared resources without "locking" the system bus, thus maintaining the increased efficiency and additional advantages offered by a multiprocessor system. It is to this end that the present invention is directed.

SUMMARY OF THE INVENTION

To facilitate inter-processor communication between multiple processors in a computer system and to enable the accessing of a dual port memory, or other system resources, without requiring the memory or the data/address bus to be locked, the present invention provides a semaphore unit that preferably incorporates a shared mailbox architecture that, in combination with a set of hardware semaphore registers, enables inter-process communication among the multi-processors. Cooperative multitasking may be accomplished through the use of shared mailbox communication protocols while a preemptive multitasking may be accomplished through the use of hardware semaphore registers.

In an aspect, the invention provides a system for facilitating inter-processor communication in a multiple processor computer system having one or more shared resources. The system comprises first and second mailboxes and a semaphore unit. The first mailbox may be associated with a first processor, such as a host processor, for indicating the status of the shared resources in the system and for sharing one or more tasks among the multiple processors, and the second mailbox may be associated with a second processor, such as a co-processor, for indicating the status of the shared resources in the system and for sharing one or more tasks among the multiple processors. The semaphore unit may indicate the status of the shared resources in the system and may notify the first and second processors of a particular task to be executed by the respective processors. Advantageously, tasks are shared among the multiple processors without latency.

In particular features of the invention, either the first or second mailbox receives a message from the semaphore unit indicating a task to be executed, and the first or second mailbox notifies its associated processor of the message. In addition, either the first or second mailbox causes a respective interrupt signal to be communicated to its associated processor when a message is received from the semaphore unit. In response to the respective interrupt signal, the particular processor services the interrupt signal by reading the message from the associated mailbox. Upon reading the message from the associated mailbox, the mailbox is cleared and an acknowledge notification is communicated by the mailbox to the other processor to indicate that the mailbox is empty and that the task is being executed.

In an embodiment of the invention, the semaphore unit preferably comprises a first plurality of semaphore registers for indicating the status of a shared resource in the system and a second plurality of semaphore registers for indicating messages that are communicated to the first and second mailboxes to notify a respective processor of a task to be executed. The semaphore registers may be controlled by a semaphore controller. The first plurality of semaphore registers may comprise a first register for indicating the status of a shared resource in the system, a second register for setting particular bits in the first register to indicate the data stored in a particular memory location of the shared resource, and a third register for clearing particular bits in the first register. The second plurality of registers comprises a fourth register and a fifth register for indicating a message for the respective mailboxes of a task to be executed. Preferably, the first, second, and third registers are 32 bit registers. In response to being notified of a task to be executed, the respective processor reads the data from the first register to execute the task.

The first register may comprise a first bit portion wherein each individual bit is associated with a particular shared resource in the system, and a second bit portion for indicating the data stored in a particular memory location of that particular shared resource. The first bit portion may comprise six bits such that the most significant bit in the first bit portion is associated with a host instruction memory, the next most significant bit in the first bit portion is associated with a ping buffer, the next most significant bit in the first bit portion is associated with a pong buffer, the next most significant bit in the first bit portion is associated with a coprocessor instruction memory, the next most significant bit in the first bit portion is associated with a cache memory, and the least significant bit in the first bit portion is associated with input/output resources. By indicating particular bits in a bit sequence, a shared resource can be identified, and its associated data can be dynamically configured accordingly.

The invention also affords a method for facilitating interprocessor communication in a multiple processor computer system having one or more shared resources. The method comprises the steps of sending a message to a first mailbox indicating a task to be executed by a first processor; notifying the first processor of the message; reading the message from the first mailbox; configuring a first semaphore register to indicate the data contained at a desired address location of a particular one of the shared resources; and accessing the first semaphore register and reading the data from the first semaphore register to execute the task. The method may also include the step of clearing the data in the first semaphore register. The notifying step comprises the step of interrupting the first processor with an interrupt signal. Upon performing the reading step further performing the step of clearing the message from the first mailbox and sending an acknowledge message to a second processor informing the second processor that the first mailbox is empty and that the task is being performed.

BRIEF DESCRIPTION OF THE DRAWINGS

FIG. 3 is a diagram illustrating an exemplary set of semaphore hardware registers that may by used by the semaphore unit to enable interprocessor communication in accordance with the invention.

DETAILED DESCRIPTION OF THE PREFERRED EMBODIMENT

Figure 1:
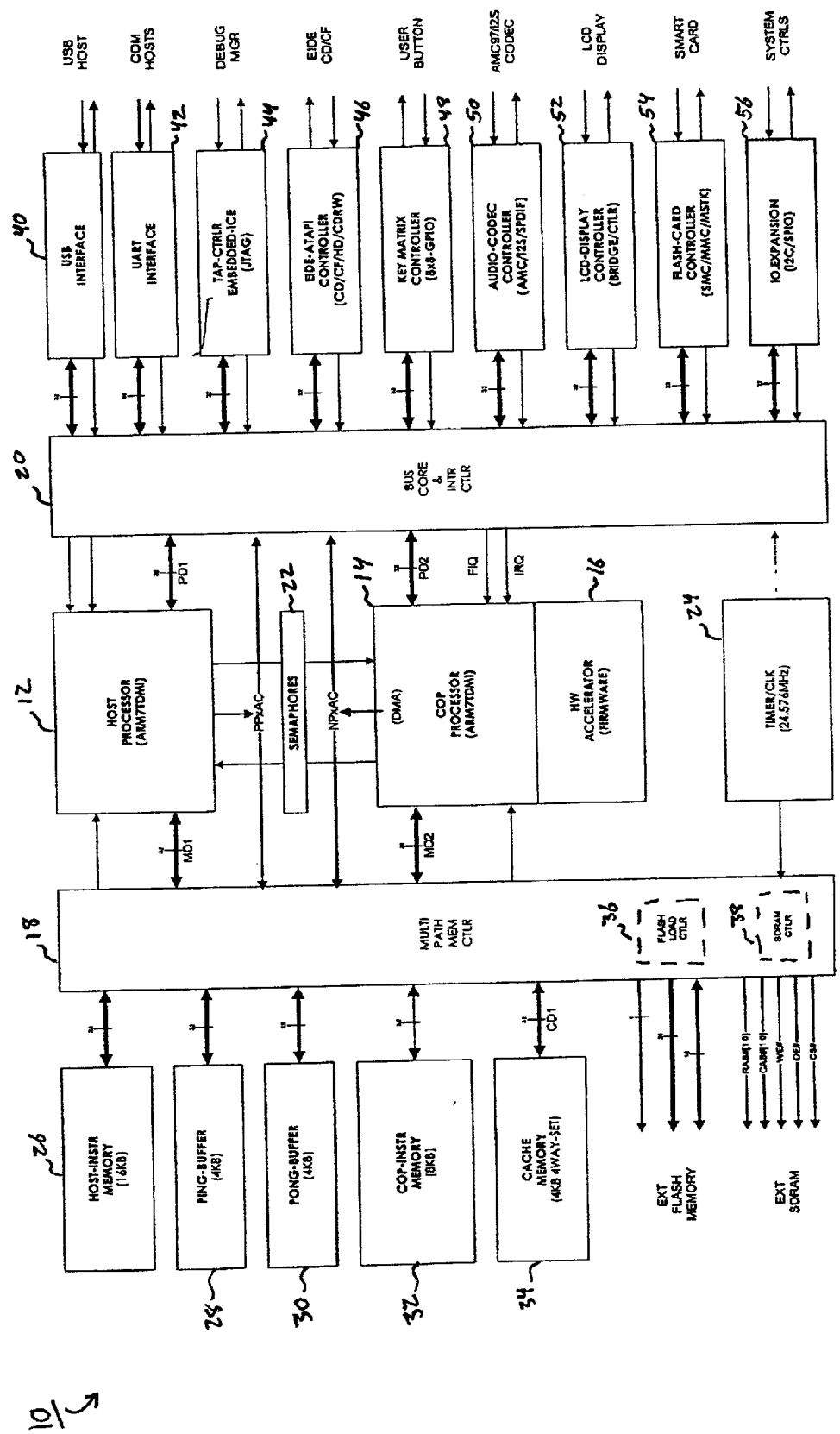
FIG. 1 is a block diagram of an exemplary architecture of a multiprocessor system with which the invention may be utilized.

In order to better illustrate the advantages of the present invention, an exemplary embodiment of a multi-processor system with which the invention may be utilized will first be briefly described. However, the present invention may be utilized with alternative multi-processor systems, and description of the system below is merely exemplary. FIG. 1 is a block diagram illustrating an exemplary embodiment of a multi-processor system 10 with which the invention may be utilized. The multi-processor system 10 is described in more detail in Applicant's co-pending U.S. patent application Ser. No. 09/849,885, entitled "Mulitprocessor Interrupt Handling System and Method", which was filed on May 2, 2001, and which is incorporated herein by reference in its entirety. The system 10 is briefly described below.

As shown in FIG. 1, the system 10 may include a host processor 12 which may preferably be a reduced instruction set (RISC) ARM core, such as is manufactured by ARM, Inc., and a coprocessor core 14 that operate in a cooperative manner to complete various system tasks. The system 10 may also include a hardware accelerator engine 16. The host processor 12, the coprocessor 14, and the hardware accelerator engine 16 may all be connected to a multipath memory controller 18 and a multipath peripheral controller 20. To control access to the shared resources connected to the multipath memory controller 18 and the multipath peripheral controller 20, the system 10 may include a semaphore unit 22 which permits the two processors 12, 14 to communicate with each other and control the access to the shared resources. The semaphore unit 22 permits the processors to negotiate for the access to the shared resources, as will be described below in more detail, but then, due to the multipath controllers 18, 20, permits the processors to access the resources over its own bus that is part of the controllers 18, 20. To control the timing of the controllers 18, 20, a timer/clock 24 may be connected to each controller 18, 20.

Both the memory controller 18 and the peripheral controller 20 are then in turn connected to one or more resources that are shared by the processors 12, 14. For example, the memory controller 18 may be connected to a host instruction memory 26 that is typically accessed by the host processor 12, a ping buffer 28, a pong buffer 30, and a coprocessor instruction memory 32 which is typically accessed by the coprocessor 14. The host processor 12 may always have priority access to its instruction memory 26 and the coprocessor may always have priority access to its instruction memory 32 since the two processors 12, 14 each have separate buses connected to each resource. The memory controller 18 may also be connected to a cache memory 34, such as a 4-way 4 KB set associated cache, a flash memory interface 36 for connecting to an external flash memory (not shown) and an external synchronous dynamic random access memory (SDRAM) interface 38 with the various necessary signals, such as RAS, CAS, WE, OE, and CS, to interface to a typical SDRAM.

The peripheral multipath controller 20, which operates in a manner similar to the memory controller 18, in that each processor 12, 14 may access different shared resources simultaneously, may have one or more peripherals connected to it. For example, the peripheral controller 20 may be connected to a universal serial bus (USB) interface 40 that in turn may connect to a USB device or host, a universal asynchronous receiver/transmitter (UART) interface 42 that in turn may connect to communication port (COM) hosts, a TAP/embedded ICE controller 44, an EIDE-CD/CF controller 46 to interface to hard disk drives or CD drives, a key matrix controller 46 that connects to a user input keyboard, an audio codec controller 48 that connects to an audio coder/decoder (codec), a liquid crystal display (LCD) controller 50 that connectes to a LCD display, a smartcard controller 52 for connecting to a smart card, and an input/output (I/O) expansion port 54 that connects to one or more different input/output devices. As with the memory controller 18, the peripheral controller 20 provides access for each processor 12, 14 to each shared resource.

Figure 2:
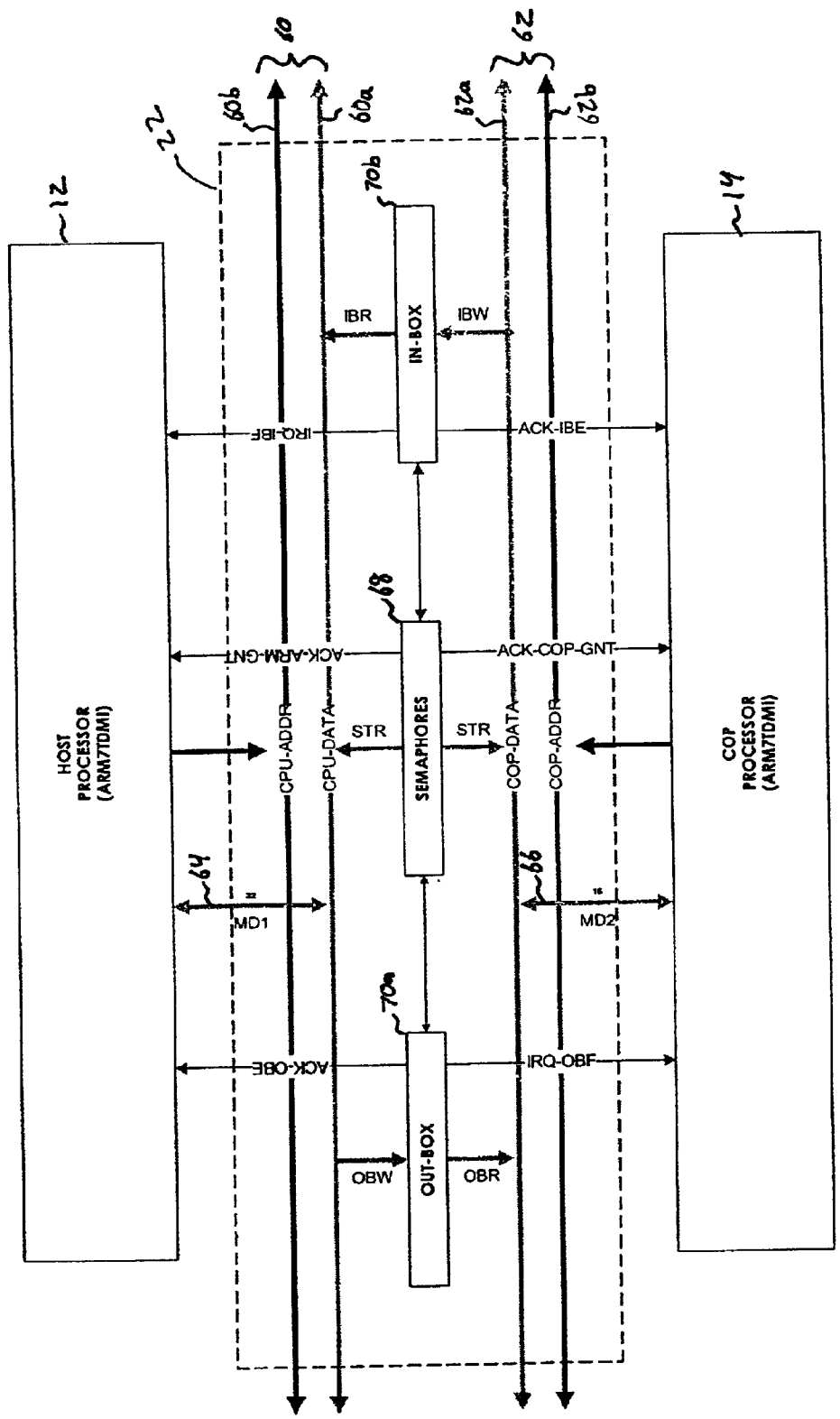
FIG. 2 is a diagram illustrating, in more detail, the semaphore unit shown in FIG. 1.

FIG. 2 is a diagram illustrating, in more detail, the semaphore unit 22 shown in FIG. 1. As described above, the host processor 12 and the coprocessor 14 access the shared resources via their own individual bus 60, 62. The host processor 12 communicates via a first bus 60, which may preferably be designed to allow efficient data communication with an ARM process, or other similar process, while the coprocessor 14 communicates via a second bus 62, which may preferably be designed to allow efficient data communication with a particular DSP processor. The individual busses 60, 62 may be separated into a respective data bus 60a, 62a, and an address bus 60b, 62b to allow for a more efficient communication pipeline. Preferably, the busses 60, 62 are 32 bit busses.

The host processor 12 communicates with the first data bus 60a via a first memory data bus 64 (MD1). Similarly, the coprocessor 14 communicates with the second data bus 62a via a second memory data bus 66 (MD2). The memory data busses 64, 66 are preferably 32 bit data busses, however, alternative bus sizes may be utilized without departing from the invention. The host processor 12 and the coprocessor 14 may read and write data to, for example, a dual port memory (not shown) such as is described in more detail in co-pending patent application Ser. No. 09/847,991, which is incorporated herein by reference, or may otherwise send and receive data from the shared system resources, via these busses.

To facilitate inter-processor communication between the host processor 12 and the coprocessor 14, and to enable the accessing of the dual port memory, or other system resources, without requiring the memory or the data/address bus to be locked, the semaphore unit 22 preferably incorporates a shared mailbox architecture (described below) that, in combination with a set of hardware semaphore registers 68, enables inter-process communication among the multi-processors. Cooperative multitasking may be accomplished through the use of shared mailbox communication protocols while a preemptive multitasking may be accomplished through the use of hardware semaphore registers. Cooperative multitasking is a type of multitasking in which the process currently controlling the processor must offer control to other processes. Different processes can share processor time. In contrast, preemptive multitasking involves designing tasks in which a computer's operating system uses some criteria to decide a length of time to allocate to any one task before allowing another task to be processed. The cooperative/preemptive multitasking features of the invention will be described in more detail below.

As discussed, in addition to the set of semaphore registers 68, the semaphore unit 22 may include first and second mailboxes 70a, 70b for indicating the status of the shared resources in the system as maintained by the semaphore registers 68 and for sharing tasks among the multiple processors 12, 14 without latency. While two mailboxes are described, those skilled in the art will recognize that any number of mailboxes can be used without departing from the invention. Each mailbox 70a, 70b is preferably unidirectional. That is, each mailbox 70a, 70b communicates messages to a particular processor 12, 14. For example, in FIG. 2, the first mailbox 70a sends command requests from the host processor 12 to the coprocessor 14. Similarly, the second mailbox 70b sends command requests from the coprocessor 14 to the host processor 12. However, alternative embodiments of the invention may allow for bidirectional communication.

The first and second mailboxes 70a, 70b preferably generate a hardware interrupt signal when the respective mailboxes 70a, 70b are "full." A mailbox is considered "full" when it contains a process message for instructing one of the processors to start a particular task which will be described in more detail with reference to FIG. 3. The hardware interrupt signal interrupts the respective processor 12, 14 (IRQ-IBF interrupts the host processor 12 while IRQ-OBF interrupts the coprocessor 14) and causes the processor 12, 14 to service the interrupt by reading the message from the mailbox 70a, 70b. Upon reading the message from the mailbox 70a, 70b, the processor 12, 14 clears the task message from the mailbox and the mailbox 70a, 70b generates an acknowledge signal to notify the other processor 12, 14 (in a dual processor implementation) that the mailbox is empty (ACK-OBE notifies the host processor 12 while ACK-IBE notifies the coprocessor 14) and that the task is being completed. Messages are written to (OBW/IBW) (i.e., clearing the mailbox) and read from (OBR/IBR) the mailboxes 70a, 70b by the processors 12, 14 via the respective data busses 64, 66. The mailboxes 70a, 70b may be implemented as a set of registers located in C800-4010 and C800-4020 with dual-ported 32 bit registers, where the C800-4010 was dedicated for the CPU inbox and the C800-4020 was dedicated for the COP inbox. It was assigned such that the COP could send messages to the CPU via the C800-4010 "Inbox" register while the CPU would send messages to the COP via the C800-4020 "Outbox" register.

FIG. 3 is a diagram illustrating an exemplary set of semaphore registers 68 and mailbox messages that may be used by the semaphore unit 22 to enable interprocessor communication in accordance with the invention. Preferably, the semaphore registers 68 are 32 bit registers, however, they may be any size registers. In FIG. 3, five semaphore registers 68 are shown, however any number may be provided. The semaphore registers 68 may be managed by a semaphore controller as is well known in the art.

A first semaphore register 80a may indicate the status of a shared resource in the system. Particular bits in the register 80a may be associated with particular resources in the system to indicate the status of the resource. For example, in FIG. 3 the most significant bit (i.e., bit 31) in the register 80a is associated with a host instruction memory (RAM3). The next bit (i.e., bit 30) in the register 80a is associated with a ping buffer (RAM2). Another bit (i.e., bit 29) in the register 80a is associated with a pong buffer (RAM1). Still another bit (i.e., bit 28) in the register 80a is associated with a coprocessor instruction memory (RAM0). Another bit (i.e., bit 27) in the register 80a is associated with a cache memory (MEM), while a different bit (i.e., bit 26) in the register 80a is associated with the input/output resources (IO). Other or different associations can be made depending on the implementation. The remaining bits in the register 80*a* (i.e., bits 0–25) may be dynamically configured when needed to indicate the status of the particular resource.

A second semaphore register 80*b* may be used to set particular bits in the first register 80*a* to indicate the data for a particular resource. Depending on which resource is desired, the most significant six bits (or a different number of bits, depending on the implementation) in the second register 80*b* may be set to request a particular resource. For example, in FIG. 3 the most significant four bits (or a different number, depending on the implementation) may indicate a particular memory resource to be requested. That is, for example, the bit sequence "1000" may indicate the host instruction memory 26 (FIG. 1), whereas the bit sequence "0001" may indicate the coprocessor instruction memory 32 (FIG. 1). Individual bits in the second register 80*b* may also be set to request the cache memory or the input/output resources. The remaining bits in the second register 80*b* may be used to indicate the desired settings of the associated bits for the requested resource. These bits may be indicated in the first register 80*a*.

A third semaphore register 80*c* may be used to clear particular bits in the first register 80*a* for a particular resource. Similar to the above discussion with respect to the second register 80*b*, depending on which resource has been requested, the most significant six bits (or a different number of bits, depending on the implementation) in the third register 80*c* may be set to release that resource. Typically, when the resource is requested it is "locked" so that the read/write operation can be performed without contention. When the operation is complete, the resource is released and is again available. For example, the most significant four bits (or a different number, depending on the implementation) may indicate a particular memory (i.e., host processor instruction memory, coprocessor instruction memory, etc.) to be released. Individual bits in the third register 80*c* may also be set to release the cache memory or the input/output resources. The remaining bits in the third register 80*c* may be used to indicate the associated bits in the first register 80*a* to be cleared (i.e., by setting the appropriate bits to "0"). When the resource is released, typically its contents in the status register are cleared.

Fourth and fifth semaphore registers 80*d*, 80*e* may be used as messages that are communicated to the respective processors 12, 14 via the mailboxes 70*a*, 70*b*. The fourth semaphore register 80*d* may be associated with the first mailbox 70*a*, while the fifth semaphore register 80*e* may be associated with the second mailbox 70*b*. The four most significant bits (or a different number, depending on the implementation) of the registers 80*d*, 80*e* may indicate whether the mailbox 70*a*, 70*b* is empty or full (i.e., bit 31 set to "1" if the mailbox is full; bit 30 set to "1" if the mailbox is empty). As discussed above, the mailbox is considered "full" when it contains a process message for instructing one of the processors of a particular task. Another bit indicates a process tag register that identifies which processor is assigned to carry out the task (i.e., for the host processor, the tag register may indicate the tag "55," while for the coprocessor the tag register may indicate the tag "AA," or some other designation). The tag register is preferably a word in size. After the processor reads the mailbox message the mailbox is cleared and an acknowledge message is passed to the other processor (in a dual processor implementation) to notify the processor that the mailbox is empty and that the task is being performed.

To better illustrate the invention, an example below describes a preferred operation of interprocessor communication in accordance with the invention. In the following example, reference will be made to FIGS. 2 and 3. As the basis for the example, consider that the host processor is to prepare a data packet at a particular address location, which the coprocessor is to run sequence of operations and return the resulting data packet to the original host processor. Accordingly, referring to FIG. 2, the host processor 12 would prepare a set of data packet within available memory space and notify the coprocessor 14 through the mailbox 70*a*. The content of the mailbox 70*a* would include operational instruction for the coprocessor 12 such as what operation is to be performed using which data packet in which location. When the host processor writes this instruction to the outbox 70*a*, the mailbox 70*a* generates an interrupt signal (IRQ-OBF) to interrupt the coprocessor 14 causing it to service the interrupt by reading the message from the mailbox 70*a* via the second memory data bus 66.

The coprocessor then acquires the availability of the resources necessary to do the tasks by reserving the semaphore register hits 68. Upon confirmed availability of the sources, the coprocessor 14 would run to complete the requested tasks and inform the host processor 12 that the task had been completed by writing completion message through the mailbox 70*b* register. The mailbox 70*b* would then generate an interrupt signal (IRQ-IBF) to interrupt the host processor 12 causing it to service the interrupt by reading the completion message from the mailbox 70*b* via the first memory data bus 64.

In order to expedite the inter-processor communication, the mailbox 70*a* controller be programmed to acknowledge the host processor 12 with ACK-OBE when the coprocessor takes (reads) the command written by host processor. Similarly, the mailbox 70*b* controller could be also programmed to acknowledge the coprocessor 14 with ACK-IBE hen the host processor takes (reads) the completion message. This hardware assisted inter-locked feed-back process helps to synchronize the work-in-progress to confirm when the second processor has received the message from the first processor and vice versa.

As mentioned above, the semaphore controller 68 may configure the first semaphore register 80*a* (FIG. 3) to indicate the data contained at the desired address location in the buffer memory so that the coprocessor 14 can perform the read instruction by accessing the semaphore register 80*a*. Accordingly, the semaphore controller may dynamically configure the appropriate bits (i.e., bits 25-0) in the first semaphore register 80*a*, for example, by instructing the second semaphore register 80*b* (FIG. 3) to set the appropriate bits (i.e., bits 25-0) in that register 80*b* to indicate the data at the particular address location in the cache memory. For example, to request the cache memory, the semaphore controller may issue a 32 bit (or other) instruction to the second semaphore register 80*b* where, for example, the six most significant bits indicate the requested shared resource. In this example, the six most significant bits may be the bit sequence "000010" to indicate the cache memory. The remaining bits in the instruction indicate the bit settings for the associated bits in the first semaphore register 80*a* which indicate the contents of the cache memory at the particular address location.

The host processor 12 (FIG. 2) may access the first semaphore register 80*a* and read the contents of the bits to read the data from the cache memory. After the task is complete, the semaphore controller may issue another 32 bit (or other) instruction to the third semaphore register 80*c* (FIG. 3) where, for example, the six most significant bits indicate the resource to be released, as described above. For example, the six most significant bits may be the bit sequence "000010" to indicate the cache memory. The remaining bits in the instruction indicate the desired bit settings for the associated bits in the first semaphore register 80a. Typically, to clear the register, these bits are set at "0". Other tasks can be communicated between the processors 12, 14 in a similar fashion.

While the foregoing has been described with reference to particular embodiments of the invention, such as a unique inter-processor communication system, it will be appreciated by those skilled in the art that changes in these embodiments may be made without departing from the principles and spirit of the invention.

What is claimed is:

1. A system for facilitating inter-processor communication in a multiple processor computer system having one or more shared resources, comprising:
   a first mailbox associated with a first processor for indicating the status of the shared resources in the system and for sharing one or more tasks among multiple-processors;
   a second mailbox associated with a second processor for indicating the status of the shared resources in the system and for sharing one or more tasks among the multiple processors; and
   a semaphore unit for indicating the status of the shared resources in the system and for notifying the first and second processors of a particular task to be executed by the respective processors.

2. The system of claim 1, wherein the first processor is a host processor and the second processor is a co-processor.

3. The system of claim 1, wherein the tasks are shared among the multiple processors without latency.

4. The system of claim 1, wherein either the first or second mailbox receives a message from the semaphore unit indicating a task to be executed, and wherein the first or second mailbox notifies its associated processor of the message.

5. The system of claim 4, wherein either the first or second mailbox causes a respective interrupt signal to be communicated to its associated processor when a message is received from the semaphore unit.

6. The system of claim 5, wherein, in response to the respective interrupt signal, the associated processor services the interrupt signal by reading the message from the associated mailbox.

7. The system of claim 6, wherein upon reading the message from the associated mailbox, the mailbox is cleared and an acknowledge notification is communicated by the mailbox to the other processor to indicate that the mailbox is empty and that the task is being executed.

8. The system of claim 1, wherein the semaphore unit comprises a first plurality of semaphore registers for indicating the status of a shared resource in the system and a second plurality of semaphore registers for indicating messages that are communicated to the first and second mailboxes to notify a respective processor of a task to be executed.

9. The system of claim 8, wherein the semaphore register are controlled by a semaphore controller.

10. The system of claim 8, wherein the first plurality of semaphore registers comprises a first register for indicating the status of a shared resource in the system, a second register for setting particular bits in the first register to indicate the data stored in a particular memory location of the shared resource, and a third register for clearing particular bits in the first register.

11. The system of claim 10, wherein the first, second, and third registers are 32 bit registers.

12. The system of claim 10, wherein the first register comprises a first bit portion wherein each individual bit is associated with a particular shared resource in the system, and a second bit portion for indicating the data stored in a particular memory location of that particular shared resource.

13. The system of claim 12, wherein the first bit portion comprises six bits such that the most significant bit in the first bit portion is associated with a host instruction memory, the next most significant bit in the first bit portion is associated with a ping buffer, the next most significant bit in the first bit portion is a associated with a pong buffer, the next most significant bit in the first bit portion is associated with a coprocessor instruction memory, the next most significant bit in the first it portion is associated with a cache memory, and the least significant bit in the first bit portion is associated with input/output resources.

14. The system of claim 12, wherein in response to being notified of a task to be executed, the respective processor reads the data from the first register to execute the task.

15. The system of claim 8, wherein the second plurality of registers comprises a fourth register and a fifth register each for indicating a message for the respective mailboxes of a task to be executed.

16. A system for facilitating inter-processor communication in a multiple processor computer system having one or more shared resources, comprising:
   means for cooperatively multitasking among the multiple processors;
   semaphore means for preemptively multitasking;
   means for notifying a respective processor of a particular task to be executed;
   means for indicating the status of the shared resources in the system; and
   means for communicating the status of a particular shared resource to the processor for execution of the task.

17. A method for facilitating inter-processor communication in a multiple processor computer system having one or more shared resources, comprising the steps of:
   sending a message to a first mailbox indicating a task to be executed by a first processor;
   notifying the first processor of the message;
   reading the message from the first mailbox;
   configuring a first semaphore register to indicate the data contained at a desired address location of a particular one of the shared resources; and
   accessing the first semaphore register and reading the data from the first semaphore register to execute the task.

18. The method of claim 17, wherein the notifying step comprises the step of interrupting the first processor with an interrupt signal.

19. The method of claim 17, wherein upon performing the reading step further performing the step of clearing the message from the first mailbox and sending an acknowledge message to a second processor informing the second processor that the first mailbox is empty and that the task is being performed.

20. The method of claim 17, further comprising the step of clearing the data in the first semaphore register.

* * * * *